(12) United States Patent
Kuniya et al.

(10) Patent No.: US 6,630,536 B2
(45) Date of Patent: Oct. 7, 2003

(54) PRESSURE-SENSITIVE ADHESIVE COMPOSITION AND PRESSURE-SENSITIVE TAPE OR SHEET

(75) Inventors: Masayoshi Kuniya, Osaka (JP); Yasuyuki Sasaki, Osaka (JP); Tsuyoshi Kasahara, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/939,694

(22) Filed: Aug. 28, 2001

(65) Prior Publication Data

US 2002/0045043 A1 Apr. 18, 2002

(30) Foreign Application Priority Data

Aug. 28, 2000  (JP) ..................................... P. 2000-257690

(51) Int. Cl.⁷ ........................... C08L 53/00; C08L 47/00
(52) U.S. Cl. ............................... 525/95; 525/98; 525/99
(58) Field of Search ............................... 525/95, 98, 99

(56) References Cited

U.S. PATENT DOCUMENTS

| 4,024,312 A | 5/1977 | Korpman |
|---|---|---|
| 4,231,369 A | 11/1980 | Sorensen et al. |
| 4,551,490 A | 11/1985 | Doyle et al. |
| 5,274,036 A | 12/1993 | Korpman et al. |
| 5,468,237 A | 12/1995 | Miller et al. |
| 5,587,237 A | 12/1996 | Korpman et al. |
| 5,760,135 A | 6/1998 | Korpman et al. |

FOREIGN PATENT DOCUMENTS

| DE | 42 07 657 A1 | 9/1992 |
|---|---|---|
| EP | 0 285 181 A2 | 10/1988 |
| EP | 1 043 373 A2 | 10/2000 |
| WO | WO 99/11728 A1 | 3/1999 |

OTHER PUBLICATIONS

European Search Report dated Nov. 15, 2002.
European Search Report for EP 01 12 0481 dated Jan. 16, 2003.

*Primary Examiner*—Kriellion A. Sanders
(74) *Attorney, Agent, or Firm*—Sughrue Mion, PLLC

(57) ABSTRACT

A pressure-sensitive adhesive composition comprises: 100 parts by weight of a rubber component that is solid in an ordinary temperature; 30 to 170 parts by weight of a rubber component that is liquid in an ordinary temperature; and 50 to 400 parts by weight of a tackifier, wherein the amount of the tackifier is 25 to 80 parts by weight based on 100 parts by weight of the total amount of the rubber components.

6 Claims, No Drawings

PRESSURE-SENSITIVE ADHESIVE COMPOSITION AND PRESSURE-SENSITIVE TAPE OR SHEET

BACKGROUND OF THE INVENTION

1. Field of the Invention

The present invention relates to a pressure-sensitive adhesive composition, and a pressure-sensitive adhesive tape or sheet using the same. More specifically, it relates to a pressure-sensitive adhesive composition, and a pressure-sensitive adhesive tape or sheet to be used optimally for the external application in the field of medical hygiene, sports, and the beauty and health, as a first aid adhesive tape, a large size adhesive plaster, or a dressing material.

2. Description of the Related Art

In a pressure-sensitive adhesive composition provided for the application in a form of a pressure-sensitive adhesive tape or sheet, the adhesive property with respect to an adherend, the adhesive property (anchoring property) with respect to a backing film surface, and the cohesive property in a pressure-sensitive adhesive layer should be balanced. By balancing the same, quick contact and adhesion to an adherend can be enabled as well as the pressure-sensitive adhesive tape or sheet can be peeled off at the time of peeling and removing the same from the adherend neatly without the so-called adhesive residue phenomenon of leaving the pressure-sensitive adhesive on the surface of the adherend.

Moreover, the pressure-sensitive adhesive composition can be, in general, divided into an acrylic based adhesive and a rubber based adhesive on the whole. The acrylic based adhesive can be obtained by polymerization of an acrylic acid ester based monomer used as the main component monomer. Since a pressure-sensitive adhesive composition can be obtained according to the demanded characteristics, it is used widely.

In contrast, the rubber based adhesive can be divided into a natural rubber based one and a synthetic rubber based one on the whole. Compared with the acrylic based adhesive, it has a superior adhesive property. Moreover, it can be produced easily only by mixing materials as well as it has a relatively good reproductivity.

Such a rubber based adhesive, in general, comprises a rubber component and a tackifier as the main component, and optionally other materials such as a softening agent and a filler. That is, a pressure-sensitive adhesive composition is provided by adding a tackifier having a high glass transition temperature to the rubber component, which has a glass transition temperature of an ordinary temperature or less so as to adjust the glass transition temperature of the entire product to a temperature slightly lower than the actual use temperature.

However, since the pressure-sensitive adhesive tape or sheet is used in various fields. In particular, in the case of the medical application, the beauty and health application, the sports application, or the like, since the adherend is a skin surface, strict conditions are applied to the demanded characteristics compared with the case of a pressure-sensitive adhesive tape or sheet to be bonded on a surface other than an organism surface. That is, since the skin surface state differs individually, the bonding state differs largely for a person with dry skin and a person with oily skin even in the case the same adhesive tape or sheet is used. Moreover, it differs also depending on the attachment position. In the case of attaching on a bending part such as an elbow or knee joint, or on a finger, a higher skin adhesive property is required. Furthermore, the excellent adhesive property with respect to bathing, kitchen work, perspiration, or the like (water proof adhesive property) is required as well as adjustment is necessary so as not to fluctuate the adhesive force in a low temperature of winter. That is, since the pressure-sensitive adhesive tape or sheet to be attached on the skin surface is used in most cases in a severer condition with respect to an ordinary adhesive tape or sheet, development of a pressure-sensitive adhesive composition having a higher adhesive force, capable of satisfying the need is keenly called for.

As a method for improving the adhesive force and the adhesion force, addition of a tackifier can be presented. However, in the case the tackifier is contained by a large amount, the glass transition temperature of the entire product is raised as mentioned above so that the adhesion force tends to be lowered in a low temperature. Moreover, since the tackifier has a relatively low molecular weight of several hundreds to several thousands, in the case it is contained by a large amount, it may be bloomed from a pressure-sensitive adhesive layer and transferred into a backing film so as to wet the backing film and generate wrinkles in the film.

In contrast, JP-W-8-506127 (published Japanese translation of PCT international publication) discloses a proposal for balancing the adhesion characteristic without containing a tackifier. It is for maintaining the adhesion characteristic only with a rubber component that is solid in an ordinary temperature and a liquid rubber component without containing a tackifier. By containing the liquid rubber component instead of the tackifier, the entire product is plasticized so as to lower the glass transition temperature, and improve the adhesive property with respect to an adherend. However, the cohesive force in the pressure-sensitive adhesive layer tends to be lowered, and it becomes too soft in an ordinary temperature. Therefore, for example, cohesive failure, adhesion residue of the pressure-sensitive adhesive component remained on an adherend, or the like are generated. Accordingly, a pressure-sensitive adhesive composition having a relatively sticky feeling is provided.

SUMMARY OF THE INVENTION

In order to solve the problems of the related art, the invention has been achieved. An object thereof is to provide a pressure-sensitive adhesive composition with the adhesive force, the cohesive force, and the anchoring force balanced, having the excellent low temperature characteristic and water proof characteristic, without the problem of the sticky feeling in the conventional rubber based adhesives, without the risk of swelling a backing film, and a pressure-sensitive adhesive tape or sheet using the same.

As a result of the elaborate discussion of the present inventors for achieving the object, it was found out that a pressure-sensitive adhesive composition having the excellent adhesion characteristic, which is not found in the conventional rubber based adhesives can be obtained by containing a rubber component that is solid in an ordinary temperature, a liquid rubber component, and a tackifier by a specific composition ratio so that the invention has been completed.

That is, the invention is to provide a pressure-sensitive adhesive composition containing 30 to 170 parts by weight of a rubber component that is liquid in an ordinary temperature (e.g., 25° C.), and 50 to 400 parts by weight of a tackifier with respect to 100 parts by weight of a rubber component that is solid in an ordinary temperature (e.g., 25° C.), wherein the tackifier is contained in a range of 25 to 80 parts by weight with respect to 100 parts by weight of the total rubber component amount.

Moreover, the invention is to provide a pressure-sensitive adhesive tape or sheet comprising the pressure-sensitive adhesive composition according laminated on one side of a backing film.

DETAILED DESCRIPTION OF THE INVENTION

A pressure-sensitive adhesive composition according to the invention contains a rubber component that is solid in an ordinary temperature, a rubber component that is liquid in an ordinary temperature, and a tackifier as the essential components. The effect of the invention cannot be performed without any of the components.

The rubber component that is solid in an ordinary temperature to be used in the invention serves as a base polymer for a pressure-sensitive adhesive composition. For example, an A-B type block copolymer, an A-B-A type block copolymer, or the like can be used. As the A-B type block copolymer, specifically, block copolymers such as a styrene-butadiene block copolymer, and a styrene-isoprene block copolymer can be used. A block copolymer used in the invention is preferably a linear block copolymer. It is not preferable to use a radial block copolymer because it has a high cohesive force compared with a linear block copolymer so that in the case it is used as a pressure-sensitive adhesive, it is inferior in terms of tacking and wettability with respect to the adherend.

Moreover, among the A-B type block copolymers and the A-B-A type block copolymers, it is preferable to use the styrene/isoprene block copolymer, and the styrene/isoprene/styrene block copolymer rather than the other rubbers solid in an ordinary temperature because the cohesive force and the elastic modulus can be balanced easily so as to facilitate designing of the pressure-sensitive adhesive as well as processing. In particular, those having a 10 to 20% by weight styrene unit content and a weight average molecular weight of 80,000 to 300,000 can be used preferably.

Furthermore, in the case a styrene/isoprene/styrene block copolymer is used, it is preferable to use a mixture containing a styrene/isoprene copolymer as a diblock copolymer by 60 to 90% by weight rather than one containing a styrene/isoprene/styrene block copolymer by 100% in terms of tacking and wettability with respect to the adherend.

Moreover, as a rubber component that is liquid in an ordinary temperature used in the invention, those compatible with the solid rubber component, such as a liquid polyisoprene and a derivative thereof, a liquid polybutadiene, a liquid polyisobutylene, a liquid polybutene, a liquid styrene-isoprene copolymer, a liquid isoprene-butadiene copolymer, or the like can be presented. They can be used alone or in a combination of two or more.

As the liquid rubbers, those having about a 10,000 to 100,000, preferably 20,000 to 60,000 weight average molecular weight can be used preferably in order to prevent transfer to a backing film comprising a pressure-sensitive adhesive tape or sheet.

In the invention, according to a pressure-sensitive adhesive composition containing the solid rubber and liquid rubber, the low temperature characteristic can be improved. However, since the adhesion characteristic involves a slight problem in an ordinary temperature region, a tackifier is contained. As such a tackifier, natural resins of terpene based, rosin based, or a derivative thereof, and synthetic resins of aliphatic group based, aromatic group based, petroleum resin based, alkyl phenol based, xylene based, or coumarone indene based, or the like can be used. They can be used alone or in a combination of two or more.

The tackifier, which is homogeneously compatible with the solid rubber and liquid rubber components, is for improving the adhesion characteristic in an ordinary temperature and preventing the sticky feeling. The number average molecular weight of such a tackifier is about 500 to 2,000, preferably 600 to 1,500 for providing a good compatibility and preventing transfer to a backing film.

Furthermore, in order to prevent transfer of the tackifier to the backing film, it is preferable to strictly administrate the SP value (solubility parameter) of the tackifier, and it is preferable to adopt a tackifier having an SP value away from that of the backing film. Specifically, the kind of the tackifier to be used can be selected optionally according to the combination with the backing film, but for example, in the case an olefin based backing film is used, as the tackifier, a terpene based natural resin can be used preferably.

A pressure-sensitive adhesive composition according to the invention contains the rubber component that is solid in an ordinary temperature, the rubber component that is liquid in an ordinary temperature, and the tackifier by a specific ratio. According to the composition ratio, the targeted object can be achieved. Specifically, 30 to 170 parts by weight, preferably 40 to 115 parts by weight of the rubber component that is liquid in an ordinary temperature, and 50 to 400 parts by weight, preferably 60 to 150 parts by weight of the tackifier are contained with respect to 100 parts by weight of the rubber component that is solid in an ordinary temperature as well as the tackifier is contained in a range of 25 to 80 parts by weight, preferably 40 to 70 parts by weight with respect to 100 parts by weight of the total amount of the rubber components.

In the case the amount of the liquid rubber component is small, it is difficult to improve the pressure-sensitive adhesion characteristic in a low temperature. In contrast, in the case the amount is too large, the cohesive force is lowered so that adhesive residue or generation of sticky feeling on the skin surface tend to occur.

Moreover, in the case the amount of the tackifier with respect to the solid rubber component is too small, an adhesive property superior to that of the conventional rubber based adhesive can hardly be provided. In contrast, in the case the amount is too large, the glass transition temperature of the entire adhesive becomes high so that the adhesive property at an ordinary temperature tends to be lowered. Furthermore, it is necessary to adjust the amount of the tackifier in the range with respect to the rubber component total amount. If it is less than 25 parts by weight with respect to the rubber component total amount, it is difficult to provide an adhesive property superior to that of the conventional rubber based adhesive. In contrast, if it is more than 80 parts by weight, the adhesive property under an ordinary temperature is lowered, and further, the agent can easily transfer to the backing film so as to swell the film.

A pressure-sensitive adhesive composition according to the invention is made of the essential components. In the range not to deteriorate the adhesion characteristic, a cross-linking agent, an antioxidant, a heat stabilizing agent, a pigment, an ultraviolet ray absorbing agent, a filler, or the like can be contained optionally.

A pressure-sensitive adhesive tape or sheet (hereinafter referred to as adhesive tapes) according to the invention is provided by forming the pressure-sensitive adhesive composition on one side of a backing film like a layer. The backing film can be obtained from materials such as urethane based polymers including a polyether urethane, and a polyester urethane, amide based polymers including a polyether polyamide block polymer, acrylic based polymers including a polyacrylate, polyolefin based polymers including a polyethylene, a polypropylene, an ethylene/propylene copolymer, and an ethylene/vinyl acetate copolymer, polyester based polymers including a polyether polyester, a vinyl chloride, a vinylidene chloride, a polystyrene, a polyacrylonitrile, a polycarbonate, a polyimide, or the like. Among these examples, it is preferable to use an olefin based backing film since it has a low risk of generating a dioxin at the time of incineration, it has the excellent feeling including the flexibility, it has a sufficient mechanical strength in the practical use, and it is excellent in terms of the cost performance. It is particularly preferable to use an ethylene/vinyl acetate copolymer, an ethylene/propylene copolymer, and an ethylene/methacrylic acid copolymer. The backing film can be made of either one of the materials, or can be a laminated film having a plurality of films of an optional material laminated.

The thickness of the backing film is preferably about 30 to 200 μm, preferably 40 to 150 μm in order not to generate a strange feeling at the time of attaching on the skin surface. Moreover, it is preferable to adjust the 50% modulus (stress at the time of stretching by 50%) to about $1 \times 10^6$ to $1 \times 10^7$ Pa, and the tensile strength to about $1 \times 10^6$ to $9 \times 10^7$ Pa in order to have a good skin followability at the time of attaching on the skin as well as to provide a strength satisfactory for the practical use. By using a backing film adjusted in the ranges, the excellent skin follow ability at the time of attaching on the skin surface with a large movement such as a joint portion can be provided as well as the film can be removed without being torn at the time of peeling off, and thus it is effective.

The backing film is not limited to a non-porous film, but it is also effective to use a vapor transmissible, non-water permeable porous film in terms of prevention of stuffiness during attachment. In the case of such a film, the material is not particularly limited, and it can be obtained easily by applying a known technique for the porosity treatment. In the case of a non-porous film, tendency of decline of the vapor transmissibility is found remarkably. However, since decline of the vapor transmissibility is not found remarkably in the case of a porous film, it is useful.

The thickness of the pressure-sensitive adhesive layer to be formed on the backing film is preferably about 15 to 100 μm. In the case it is less than 15 μm, a sufficient skin adhesive property may not be provided at the time of attaching on the skin. In contrast, in the case it is more than 100 μm, protrusion of the pressure-sensitive adhesive or cost increase may be brought about.

An attaching material for the medical treatment according to the invention can be used preferably in a first aid adhesive tape, a large size adhesive plaster, a roller bandage, a dressing material, or the like. According to the application thereof, for example, in the case of an adhesive plaster having a relatively large thickness (the thickness is, in general, about 100 μm), it is preferable to use a porous film. As a base material film preferable for the porous film, a porous plastic film made of a polyolefin based resin can be presented. For example, resins such as a polyethylene, a polypropylene, and an ethylene-vinyl acetate copolymer can be used. In particular, a linear low density polyethylene resin can be used preferably in terms of the productivity and the processability. The linear low density polyethylene resin is a copolymer of an ethylene and an α-olefin. As the α-olefin, a butene, a hexene, an octene, or the like can be presented.

Adhesive tapes according to the invention have the configuration. In general, a peeling sheet treated with a peeling process such as a silicone process on the surface is attached temporarily on the exposed surface of the pressure-sensitive adhesive layer.

A pressure-sensitive adhesive composition and a pressure-sensitive adhesive tape or sheet using the same according to the invention provide the excellent adhesion characteristic under an ordinary temperature, which is not found in the conventional rubber based adhesives, by containing a solid rubber component, a liquid rubber component, and a tackifier by a specific ratio, and the excellent maintenance of the adhesion characteristic under a low temperature, and thus they can be used preferably for the application having the skin surface as the adherend.

In particular, since the pressure-sensitive adhesive composition according to the invention contains the components by the specific ratio, a tackifier may not be bloomed and transferred into a backing film so that adhesive tapes with the excellent practicality can be obtained without the risk of generating wrinkles in the backing film.

EXAMPLES

Hereinafter, the invention will be described further specifically with reference to examples, but the invention is not limited thereto, and various modifications can be performed without departing from the scope of the technological idea of the invention. In the description below, a "part" denotes a "part by weight", and "%" denotes "% by weight".

Example 1

A solution of a pressure-sensitive adhesive composition was produced by dissolving 100 parts of a styrene/isoprene/styrene block copolymer (styrene content: 15%, weight average molecular weight: 188,000, diblock content: 78%), 40 parts of a liquid polyisoprene (weight average molecular weight 29,000), and 60 parts of a β-pinene (number average molecular weight: 1,350, softening point: 115° C.) in a toluene so as to have a 55% solid component concentration.

Next, the pressure-sensitive adhesive solution was applied and dried on the processed surface side of a separator treated with a silicone process on one side so as to have a 40 μm thickness after drying so as to form a pressure-sensitive adhesive layer.

Then, the produced adhesive layer was attached on an ethylene/vinyl acetate copolymer film (100 μm thickness) so as to provide a pressure-sensitive adhesive sheet according to the invention.

Example 2

A solution of a pressure-sensitive adhesive composition was produced by dissolving 100 parts of a styrene/isoprene/styrene block copolymer (same as the example 1), 115 parts of a liquid polyisoprene (same as the example 1), and 150 parts of a β-pinene (same as the example 1) in a toluene so as to have a 55% solid component concentration.

Next, the pressure-sensitive adhesive solution was applied and dried on the processed surface side of a separator treated with a silicone process on one side so as to have a 40 μm thickness after drying so as to form a pressure-sensitive adhesive layer.

Then, the produced adhesive layer was attached on an ethylene/vinyl acetate copolymer film (100 μm thickness) so as to provide a pressure-sensitive adhesive sheet according to the invention.

Comparative Example 1

A pressure-sensitive adhesive sheet was produced in the process same as that of the example 1 except that a pressure-sensitive adhesive composition solution was produced by dissolving 100 parts of a styrene/isoprene/styrene block copolymer (same as the example 1), 115 parts of a liquid paraffin, and 150 parts of a β-pinene (same as the example 1) in a toluene so as to have a 55% solid component concentration.

Comparative Example 2

A pressure-sensitive adhesive sheet was produced in the process same as that of the example 1 except that a pressure-sensitive adhesive composition solution was produced by dissolving 100 parts of a styrene/isoprene/styrene block copolymer (same as the example 1), and 150 parts of a β-pinene (same as the example 1) in a toluene so as to have a 55% solid component concentration.

Comparative Example 3

A pressure-sensitive adhesive sheet was produced in the process same as that of the example 1 except that a pressure-sensitive adhesive composition solution was produced by dissolving 100 parts of a styrene/isoprene/styrene block copolymer (same as the example 1), and 115 parts of a liquid polyisoprene (same as the example 1) in a toluene so as to have a 55% solid component concentration.

Comparative Example 4

A pressure-sensitive adhesive sheet was produced in the process same as that of the example 1 except that a pressure-sensitive adhesive composition solution was produced by dissolving 100 parts of a styrene/isoprene/styrene block copolymer (styrene content: 15%, diblock content: 40%), and 300 parts of a liquid polyisoprene (same as the example 1) in a toluene so as to have a 55% solid component concentration.

Comparative Example 5

A pressure-sensitive adhesive sheet was produced in the process same as that of the example 1 except that a pressure-sensitive adhesive composition solution was produced by dissolving 100 parts of a styrene/isoprene/styrene block copolymer (same as the comparative example 4), and 300 parts of a liquid polyisoprene (weight average molecular weight: 47,000) in a toluene so as to have a 55% solid component concentration.

Comparative Example 6

A pressure-sensitive adhesive sheet was produced in the process same as that of the example 1 except that a pressure-sensitive adhesive composition solution was produced by dissolving 100 parts of a styrene/isoprene/styrene block copolymer (same as the example 1), 250 parts of a liquid polyisoprene (same as the example 1), and 150 parts of β-pinene (same as the example 1) in a toluene so as to have a 55% solid component concentration.

Comparative Example 7

A pressure-sensitive adhesive sheet was produced in the process same as that of the example 1 except that a pressure-sensitive adhesive composition solution was produced by dissolving 100 parts of a styrene/isoprene/styrene block copolymer (same as the example 1), 115 parts of a liquid polyisoprene (same as the example 1), and 500 parts of a β-pinene (same as the example 1) in a toluene so as to have a 55% solid component concentration.

The pressure-sensitive adhesive sheets obtained in the examples and the comparative examples were evaluated for the skin adhesive force, the tacking, and the backing film swelling property by the following methods. Results are shown in the table 1.

<Skin Adhesive Force>

The pressure-sensitive adhesive sheets produced in the examples and the comparative examples were cut into a strip-like shape of a 19 mm width and a 100 mm length. The strips were pressed on a human skin arm part by a 2 kg roller by one reciprocal movement at about a 50 mm/second rate under a 23±2° C., relative humidity 65±15% environment. After leaving for 30 minutes, the pressure-sensitive adhesive sheets were peeled off by a 90 degree peeling angle, and a 300 mm/minute peeling rate. The peeling stress applied at the time was defined to be the skin adhesive force. The skin surface was observed after the peeling operation for examining existence or absence of the sticky feeling derived from the adhesive residue on the skin surface at the same time.

<Tacking>

The backing film side of the pressure-sensitive adhesive sheets produced in the examples and the comparative examples was lined with a polypropylene adhesive tape (produced by Nitto Denko Corp., Danpuron Tape No. 375). With a probe tack tester (produced by Rigaku Kogakusha Corp.), the stress at the time of peeling off a 5 mm diameter stainless steel probe from the pressure-sensitive adhesive layer surface by a 100 g pressure load, 1 second contact time, and 10 mm/second peeling rate condition was measured under a 23±2° C., relative humidity 65±15% environment. The value thereof was defined to be the tacking value.

<Backing Film Swelling Property>

The pressure-sensitive adhesive sheets produced in the examples and the comparative examples were cut into a 100 mm square rectangular shape. After leaving at 50° C. for 3 days, the appearance of the backing film was judged by the following judgment standard.

A: Swelling or wrinkles are not generated on the backing film.
B: Slight swelling is observed on the backing film.
C: Swelling and wrinkles are generated apparently on the backing film.

TABLE 1

| | Example | | Comparative example | | | | | | |
|---|---|---|---|---|---|---|---|---|---|
| | 1 | 2 | 1 | 2 | 3 | 4 | 5 | 6 | 7 |
| Skin adhesion force (N/19 mm) | 2.7 | 3.8 | 3.5 | 0.2 | 2.0 | 0.7 | 1.0 | 3.0 | 0.1 |
| Sticky feeling | No | No | Yes | No | Yes | Yes | Yes | Yes | No |
| Tacking (N/5 mm diameter) | 9.5 | 9.5 | 6.5 | 0.1 | 4.3 | 3.4 | 2.4 | 5.7 | 0.1 |
| Backing film swelling property | A | A | C | A–B | A | A | A | A | B |

As it is apparent form the results of the table 1, the products of the examples show the excellent results in all items of the evaluation. In particular, as it is apparent form the results of the products of the examples containing a liquid rubber and the product of the comparative example 1 containing a liquid paraffin instead of a liquid rubber, according to the invention, the backing film is not swelled without the risk of adhesive residue on the skin surface, which is the adherend.

Moreover, as it is apparent from the results of the products of the examples containing a liquid rubber and the product of the comparative example 2 not containing a liquid rubber, the products of the invention are superior to the products of the comparative examples in all the items including the skin adhesive force, the tacking, and the backing film swelling property. They are apparently well-balanced adhesive sheets.

Furthermore, as it is apparent from the results of the products of the examples containing a tackifier and the products of the comparative examples 3 to 5 not containing a tackifier, the products of the comparative examples are slightly poor in terms of the skin adhesive force and the tacking, and they provide the sticky feeling derived from the adhesive residue on the skin surface, which is the adherend.

The entire disclosure of each and every foreign patent application from which the benefit of foreign priority has been claimed in the present application is incorporated herein by reference, as if fully set forth herein.

What is claimed is:

1. A pressure-sensitive adhesive composition comprising: 100 parts by weight of a rubber component that is solid in an ordinary temperature; 30 to 170 parts by weight of a rubber component that is liquid at 25° C.; and 50 to 400 parts by weight of a tackifier,
   wherein the amount of the tackifier is 25 to 80 parts by weight based on 100 parts by weight of the total amount of the rubber components.

2. The pressure-sensitive adhesive composition according to claim 1, wherein the rubber component that is solid in an ordinary temperature is at least one of an A-B block copolymer and an A-B-A block copolymer.

3. The pressure-sensitive adhesive composition according to claim 1, wherein the rubber component that is liquid in an ordinary temperature is at least one selected from the group consisting of a liquid polyisoprene and a derivative thereof, a liquid polybutadiene, a liquid polyisobutylene, a liquid polybutene, a liquid styrene-isoprene copolymer, and a liquid isoprene-butadiene copolymer.

4. The pressure-sensitive adhesive composition according to claim 1, wherein the tackifier is at least one selected from the group consisting of: natural resins of a terpene resin and a rosin resin or a derivative thereof; and synthetic resins of an aliphatic resin, an aromatic resin, a petroleum resin, an alkyl phenol resin, a xylene resin, and a coumarone indene resin.

5. The pressure-sensitive adhesive composition according to claim 1, wherein the amount of the rubber component that is liquid in an ordinary temperature is 40 to 115 parts by weight based on 100 parts by weight of the rubber component that is solid in an ordinary temperature.

6. The pressure-sensitive adhesive composition according to claim 1, wherein the amount of the tackifier is 40 to 70 parts by weight based on 100 parts by weight of the total amount of the rubber components.

* * * * *